(12) United States Patent
Wei et al.

(10) Patent No.: US 11,512,677 B1
(45) Date of Patent: Nov. 29, 2022

(54) PRE-CHAMBER JET IGNITION TORQUE CONTROL WITH TWO IGNITION SOURCES

(71) Applicants: Qun Wei, Troy, MI (US); William P Attard, Brighton, MI (US); Shawali Chaudhury, Rochester Hills, MI (US)

(72) Inventors: Qun Wei, Troy, MI (US); William P Attard, Brighton, MI (US); Shawali Chaudhury, Rochester Hills, MI (US)

(73) Assignee: FCA US LLC, Auburn Hills, MI (US)

( * ) Notice: Subject to any disclaimer, the term of this patent is extended or adjusted under 35 U.S.C. 154(b) by 0 days.

(21) Appl. No.: 17/689,369

(22) Filed: Mar. 8, 2022

(51) Int. Cl.
| | |
|---|---|
| *F02P 15/08* | (2006.01) |
| *F02P 23/04* | (2006.01) |
| *F02P 17/12* | (2006.01) |
| *F02P 5/15* | (2006.01) |
| *F02P 15/02* | (2006.01) |

(52) U.S. Cl.
CPC .............. *F02P 17/12* (2013.01); *F02P 5/15* (2013.01); *F02P 15/02* (2013.01); *F02P 15/08* (2013.01); *F02P 23/04* (2013.01); *F02D 2200/1004* (2013.01)

(58) Field of Classification Search
CPC .. F02P 15/02; F02P 15/08; F02P 17/12; F02P 23/04; F02D 2200/1004
USPC ........ 123/143 B, 144, 260, 287, 406.23, 638
See application file for complete search history.

(56) References Cited

U.S. PATENT DOCUMENTS

| | | | | |
|---|---|---|---|---|
| 3,776,212 | A | * | 12/1973 | Karlowitz ............... F02B 19/08 123/259 |
| 5,709,189 | A | * | 1/1998 | Monnier ............... F02F 1/4214 123/260 |
| 8,857,405 | B2 | | 10/2014 | Attard et al. |
| 9,353,674 | B2 | | 5/2016 | Bunce et al. |
| 9,732,664 | B2 | | 8/2017 | Trinkel |
| 10,612,454 | B2 | | 4/2020 | Bedogni et al. |
| 11,125,203 | B1 | | 9/2021 | Attard et al. |
| 11,156,198 | B1 | * | 10/2021 | Glugla ...................... F02P 3/05 |
| 11,187,142 | B2 | | 11/2021 | Schock et al. |
| 2004/0094119 | A1 | * | 5/2004 | Dietl ....................... F02D 37/02 123/406.47 |
| 2012/0103302 | A1 | * | 5/2012 | Attard .................. F02B 19/108 123/260 |
| 2013/0220269 | A1 | * | 8/2013 | Woo ..................... F02B 19/1085 123/260 |
| 2014/0069178 | A1 | * | 3/2014 | Beikmann ........... F02D 41/0082 73/114.07 |

* cited by examiner

*Primary Examiner* — Erick R Solis
(74) *Attorney, Agent, or Firm* — Ralph E. Smith

(57) ABSTRACT

A combustion control system and method for a turbulent jet ignition engine is presented. A controller is configured to receive a torque request, determine a target spark stagger based on a first spark from a first ignition device and a second spark from a second ignition device, determine an adjusted maximum brake torque (MBT) based on the spark stagger, determine a delta spark based on a difference between the adjusted MBT and an actual leading spark from the first and second ignition devices, determine a torque efficiency based on the delta spark, estimate an actual torque, and command a first and a second spark timing from the first and second ignition devices to satisfy the torque request.

18 Claims, 5 Drawing Sheets

PRE-CHAMBER JET IGNITION TORQUE CONTROL WITH TWO IGNITION SOURCES

FIELD

The present application generally relates to spark ignition (SI) engines and, more particularly, to techniques for determining torque efficiency and actual torque for an engine having turbulent jet ignition (TJI).

BACKGROUND

In today's internal combustion engines, the spark timing with respect to the respective piston strokes affects the quality of combustion. It is therefore desirable to accurately determine and control the spark timing because poor combustion quality due to inaccurate spark timing could result in decreased fuel economy and/or engine knock. An internal combustion engine that incorporates turbulent jet ignition (TJI) includes a pre-chamber with a first spark plug inside and installed generally in the center of the cylinder head A second spark plug is mounted in an offset position in the main combustion chamber. The pre-chamber typically connects to the main combustion chamber with multiple passages. Flame is initiated inside the pre-chamber and jets into the main combustion chamber to ignite the bulk fuel air mixture. In conventional internal combustion engines with a single spark plug in each cylinder (or multiple-spark plugs firing at the same time), torque can be estimated by multiplying engine maximum potential torque and torque efficiency. With a turbulent jet ignition (TJI) engine, however, there exists both a pre-chamber ignition from the first spark plug and a secondary ignition from the second spark plug. In this regard, both the pre-chamber and the secondary ignition timings have an influence on torque efficiency. Accordingly, there remains a need for improvement in the relevant art to properly account for both ignition timings associated with a TJI engine when determining torque.

SUMMARY

According to one example aspect of the invention, a combustion control system for a TJI engine is presented. In one exemplary implementation, the TJI engine has a first ignition device disposed in a pre-chamber of a cylinder head and a second ignition device disposed for communication with a main combustion chamber. In some implementations, the controller is configured to receive a torque request, determine a target spark stagger based on a first spark from the first ignition device and a second spark from the second ignition device, determine an adjusted maximum brake torque (MBT) based on the spark stagger, determine a delta spark based on a difference between the adjusted MBT and an actual leading spark from the first and second ignition devices, determine a torque efficiency based on the delta spark, estimate an actual torque, and command a first and a second spark timing from the first and second ignition devices to satisfy the torque request.

According to some implementations, the actual leading spark comprises a maximum actual spark realized based on an actual first spark from the first ignition device and an actual second spark from the second ignition device. In some implementations, estimating an actual torque comprises: determining an optimal torque, and calculating the actual torque as a product of the optimal torque and the determined torque efficiency. In some implementations, the optimal torque is based on a revolutions per minute (RPM) of the TJI engine and an air charge entering the TJI engine. In some implementations, the adjusted MBT is determined by an efficiency model wherein the efficiency model is based on a nominal spark stagger and a nominal MBT spark. In some implementations, the nominal spark stagger is positive for a spark event that initiates from the first ignition device and is negative for a spark event that initiates from the second ignition device. In some implementations, the TJI engine is a four-cylinder engine.

According to another example aspect of the invention, a combustion control method for a TJI engine is presented. In one exemplary implementation, the TJI engine has a first ignition device disposed in a pre-chamber of a cylinder head and a second ignition device disposed for communication with a main combustion chamber. In one exemplary implementation, the method comprises: receiving, by a controller of the vehicle, a torque request; determining, by the controller, a target spark stagger based on a first spark from the first ignition device and a second spark from the second ignition device; determining, by the controller, an adjusted maximum brake torque (MBT) based on the target spark stagger; determining, by the controller, a delta spark based on a difference between the adjusted MBT and an actual leading spark from the first and second ignition devices; determining, by the controller, a torque efficiency based on the delta spark; estimating, by the controller, an actual torque; and commanding, by the controller, a first and second spark timing from the first and second ignition devices to satisfy the torque request.

According to some implementations, the actual leading spark comprises a maximum actual spark realized based on an actual first spark from the first ignition device and an actual second spark from the second ignition device. In some implementations, estimating an actual torque comprises: determining an optimal torque, and calculating the actual torque as a product of the optimal torque and the determined torque efficiency. In some implementations, the optimal torque is based on a revolutions per minute (RPM) of the TJI engine and an air charge entering the TJI engine. In some implementations, the adjusted MBT is determined by an efficiency model wherein the efficiency model is based on a nominal spark stagger and a nominal MBT spark. In some implementations, the nominal spark stagger is positive for a spark event that initiates from the first ignition device and is negative for a spark event that initiates from the second ignition device. In some implementations, the TJI engine is a four-cylinder engine.

Further areas of applicability of the teachings of the present disclosure will become apparent from the detailed description, claims and the drawings provided hereinafter, wherein like reference numerals refer to like features throughout the several views of the drawings. It should be understood that the detailed description, including disclosed embodiments and drawings referenced therein, are merely exemplary in nature intended for purposes of illustration only and are not intended to limit the scope of the present disclosure, its application or uses. Thus, variations that do not depart from the gist of the present disclosure are intended to be within the scope of the present disclosure.

DETAILED DESCRIPTION

As previously discussed, there remains a need for improvement in the relevant art to properly account for both pre-chamber and secondary spark ignition timings associated with a TJI engine when determining engine torque. The methods and techniques discussed herein address engine torque estimation for a TJI engine having two independent ignition timings.

Figure 1:
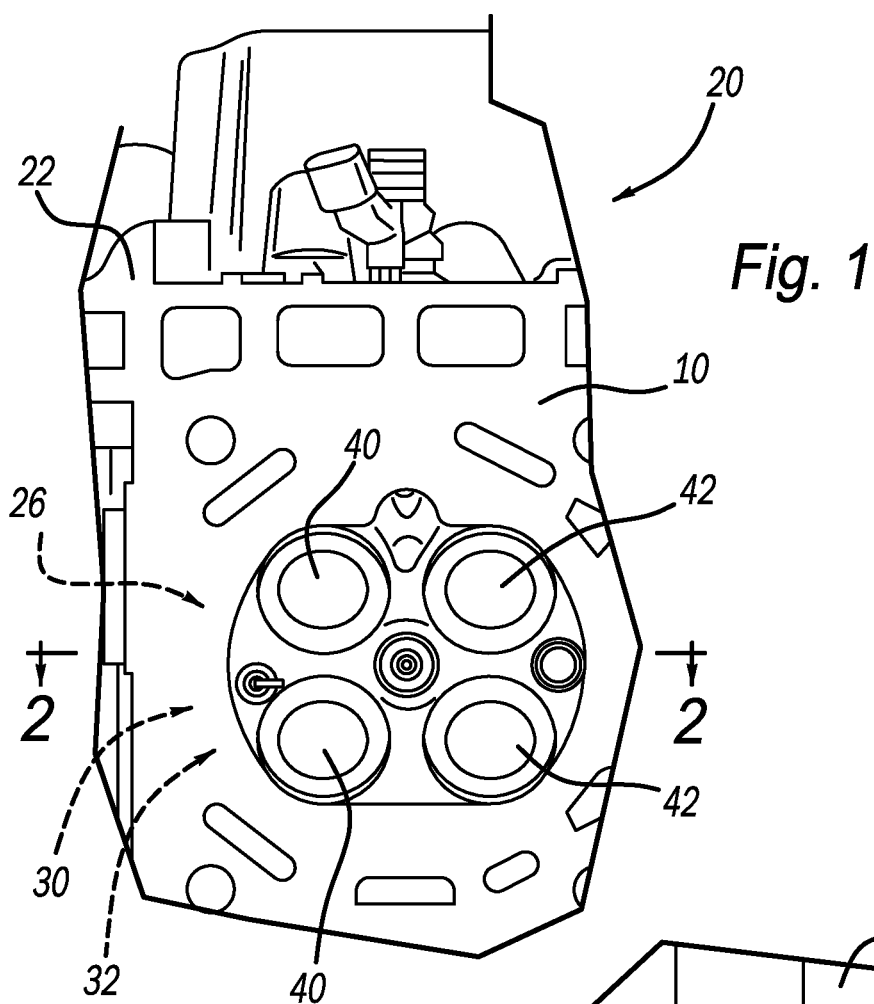
FIG. 1 is an elevational view of a cylinder head of an exemplary TJI engine according to the principles of the present disclosure.
Figure 2:
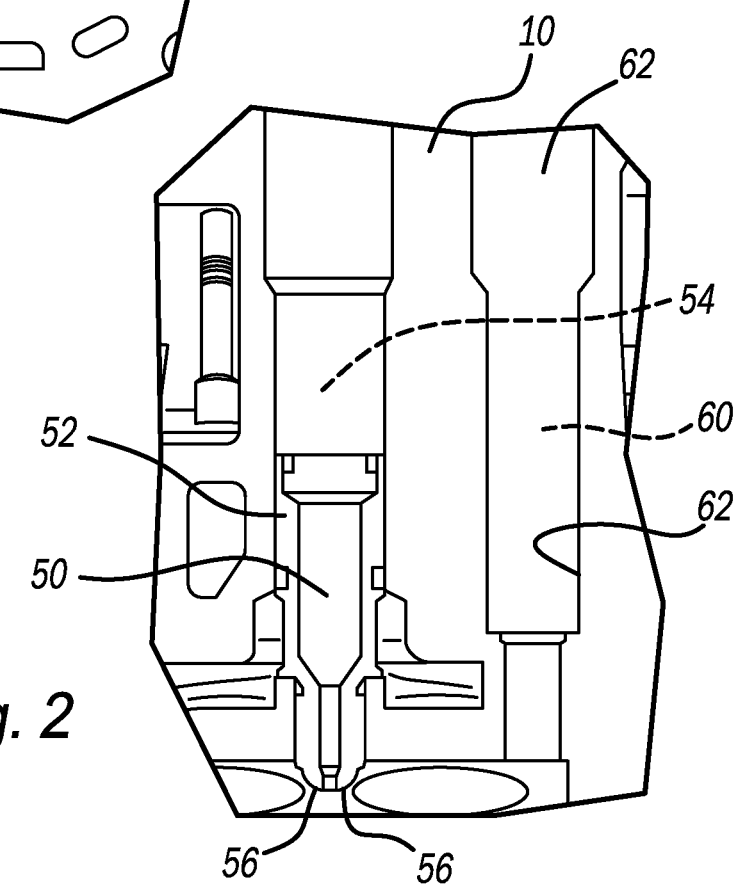
FIG. 2 is a cross-sectional view taken along lines 2-2 of FIG. 1.

With initial reference to FIGS. 1 and 2, an exemplary cylinder head is shown and generally identified at reference numeral 10. The cylinder head 10 is incorporated into an internal combustion engine 20 having an engine block 22 incorporating one or more cylinders 26. A piston 30 is supported for reciprocal movement within a cylinder 26 defined in the engine block 22. The cylinder head 10, cylinder 26 and piston 30 cooperate to define a combustion chamber 32. The exemplary internal combustion engine 20 includes two intake ports 40 and two exhaust ports 42. As is known, the intake and exhaust ports 40 and 42 open and close via valves to provide fluid communication between the cylinder and the intake manifold and the exhaust manifold (not specifically shown). It will be appreciated that while two intake ports 40 and two exhaust ports 42 are shown, the internal combustion engine 20 may incorporate any number of intake and/or exhaust valves. By way of example only the engine block 22 can be configured to have four cylinders. It will be appreciated that the methods and control strategies discussed herein can be applicable to TJI engines having different amounts of cylinders.

The cylinder head 10 includes a pre-chamber 50 having a pre-chamber insert 52 disposed therein. A first ignition device or spark plug 54 is disposed in the pre-chamber 50. The pre-chamber insert 52 defines a plurality of small orifices 56 defined therein. The orifices 56 provide communication between the pre-chamber 50 and the combustion chamber 32. An injector, not specifically shown, can deliver fuel into the pre-chamber 50. The first spark plug 54 can ignite the fuel in the pre-chamber 50.

A second ignition device or spark plug 60 is disposed in an adjacent cavity 62 provided on the cylinder head 10. In some implementations the second spark plug 60 can be referred to as a side spark plug. Once ignited, the fuel is forced through the orifices 56 of the pre-chamber insert 52. Flame is initiated inside the pre-chamber 50 and jets into the main combustion chamber 32 to ignite the bulk fuel air mixture.

Figure 3:
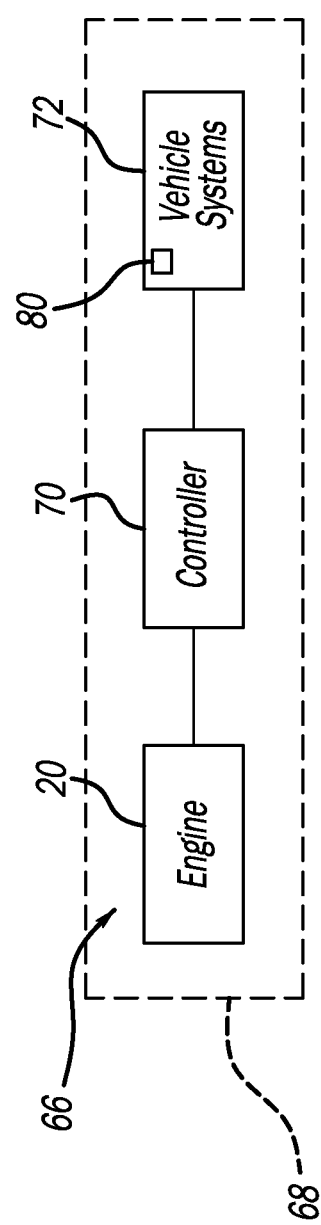
FIG. 3 is a schematic diagram of an engine system incorporating a controller that implements various control methods according to the present disclosure.

With additional reference now to FIG. 3, a combustion control system 66 for a vehicle 68 is shown having an engine control unit or controller 70 that communicates signals between the engine 20 and various vehicle systems 72. The controller 70 can receive various input signals from vehicle systems 72 such as, but not limited to, a heating venting and air conditioning (HVAC) system, an accelerator pedal 80, and an alternator. For example, a driver of the vehicle 68 could provide input via an accelerator pedal 80, which is indicative of a torque request. The controller 70 then controls the engine 20 (e.g., airflow, fuel, and spark) to achieve the torque request. The controller 70 can determine a torque model or torque request to the engine 20 based on various conditions, such as indicated from the vehicle systems 72 to achieve the desired engine torque requested by the driver.

A torque model for a conventional engine with a single spark plug in each cylinder (or multiple spark plugs firing concurrently) uses a single delta spark to estimate engine torque. The delta spark is a difference between a maximum brake torque (MBT) spark timing and an actual spark timing. MBT is a maximum torque realized at optimum engine speed and air charge. As can be appreciated if the engine is operating at MBT, the torque efficiency would be 100%.

Under some conditions however, such as during a gear change event, the controller may request a reduction in torque. In some examples, a reduction in torque can be achieved by delaying a spark event. In this regard, the actual spark timing may be different that associated with MBT causing the torque efficiency to be something less than 100%. As is known, torque efficiency can be determined using a calibrated delta spark versus an efficiency curve. Engine torque is estimated by multiplying engine MBT and torque efficiency. The torque models can be used to estimate how much the controller needs to retard spark or combustion to achieve a desired torque output.

As explained above, prior art methods of determining a torque model are not ideal for a TJI engine because a TJI engine has both a pre-chamber ignition from the first spark plug 54 and a secondary ignition from the second spark plug 62. As will be described in greater detail herein, the instant systems, methods and techniques allow the independent control of the pre-chamber spark timing using the first spark plug 54 and the secondary spark timing using the second spark plug 60. In this way, the methods disclosed by the instant disclosure account for both the pre-chamber spark timing from the first spark plug 54 and the secondary spark timing using the second spark plug 60.

According to the instant disclosure, MBT spark timing is defined as the initiated spark timing to reach MBT. For example, when the first spark plug 54 of the pre-chamber 50 initiates combustion earlier than the secondary spark from the second spark plug 60, then the MBT spark timing is the pre-chamber spark timing reaching MBT. Similarly, when the secondary spark from the second spark plug 60 initiates combustion earlier than the first spark plug 54 in the pre-chamber 50, then the MBT spark timing is the secondary spark timing reaching MBT. By way of example, if the pre-chamber 50 initiates combustion earlier than the secondary spark, the delta spark is calculated as the difference between the MBT and the pre-chamber 50 spark timing.

The timing of the pre-chamber spark ignition (firing of the first spark plug 56) and the secondary spark ignition (firing of the second spark plug 60) are controlled independently by a controller 70. As used herein, the term "spark stagger" is used to refer to the pre-chamber ignition timing minus the secondary spark plug ignition timing. If spark stagger is positive, the controller 70 determines that the pre-chamber 50 has initiated the combustion and the secondary spark fires after. Similarly, if spark stagger is negative, the controller 70 determines that the secondary spark initiates combustion. Stagger between the pre-chamber 50 and the secondary spark ignition timing will be determined with consideration of burn rate, fuel economy, combustion stability and other factors at teach engine operating condition.

Figure 4:
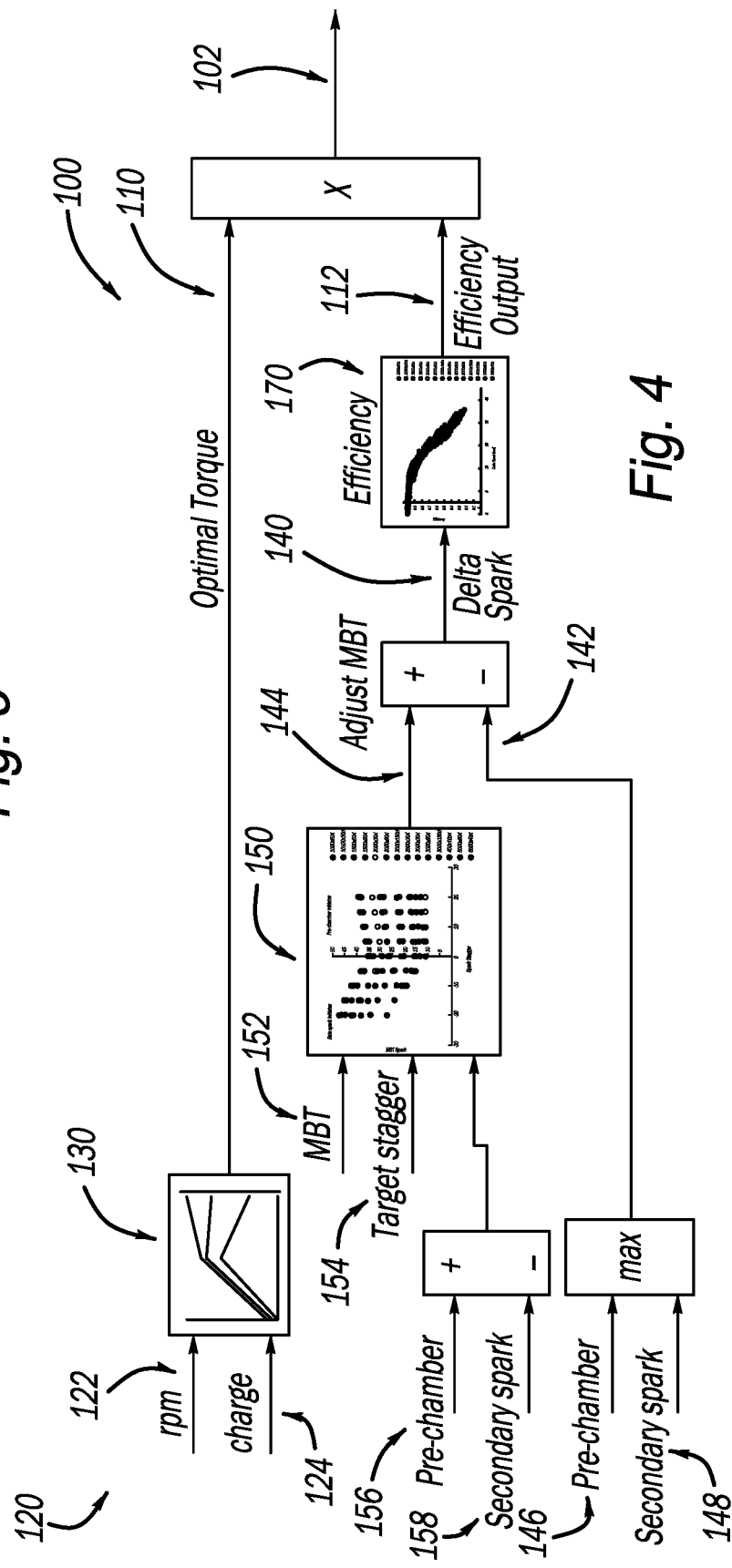
FIG. 4 is a flow diagram of an example torque estimation diagram according to the present disclosure.

With reference to FIG. 4, a torque control or model implemented by the controller 70 is shown and generally identified at reference 100. In general, the torque model 100 estimates engine torque 102 based on multiplying engine maximum or optimal potential torque 110 and torque efficiency 112. The engine maximum potential torque 110 is determined based on inputs 120 including an engine RPM and an air charge. In the example shown, the inputs 120 include engine speed 122 and air flow or charge 124. An empirical calibration table 130 can output the optimal torque 110 based on the inputs 120. The maximum potential torque 110 represents the maximum brake torque (MBT) achievable at various engine RPM and charge inputs 122, 124. In examples, the maximum potential torque 110 can be output in Newton Meters (NM).

A delta spark 140 can be output as a difference between an actual engine spark 142 and an adjusted MBT value 144 determined by an efficiency model 150. The actual spark 142 is determined to be the maximum (or earlier of the) actual pre-chamber spark 146 (first spark plug 54) or the actual secondary spark 148 (second spark plug 60). Explained differently the actual spark 142 can be referred to the leading spark of the first or second spark plug 54, 60.

Figure 6:
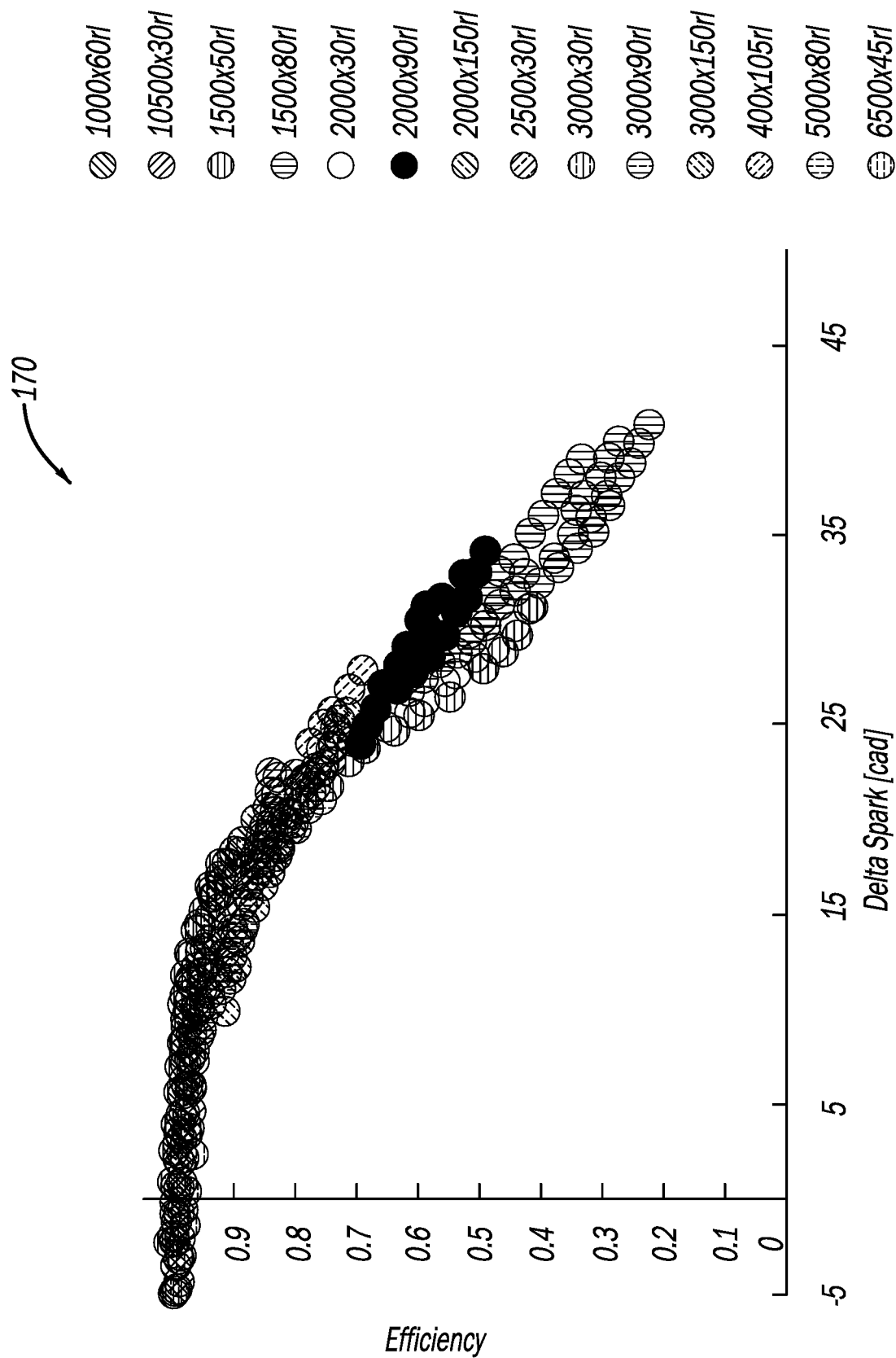
FIG. 6 is an exemplary efficiency versus delta spark according to the present disclosure.

The efficiency model 150 is based on an MBT spark 152, a target spark stagger 154, a requested pre-chamber spark 156 and a requested secondary spark 158. The MBT spark 152 is the MBT spark at a calibrated nominal value. For example, if the engine 20 is calibrated at a stagger of zero, the MBT spark may be 30 degrees before top-dead-center (TDC). If the controller 70 sends a target stagger request 154 to modify the stagger from zero to 20 degrees, the efficiency model 150 determines that the stagger changes from 30 degrees to 34 degrees. In this example, a new or adjusted MBT value 144, based on the target stagger is adjusted from 30 degrees to 34 degrees. The efficiency output 170 can be determined from an efficiency model 170 based on the delta spark 140. By way of example only, referring to the FIG. 6 plot, a delta spark of 25 degrees corresponds to an efficiency of about 0.75 (75%). If the optimal torque 110 is determined to be 100 NM, an engine torque 102 is calculated to be 75 NM.

Figure 5:
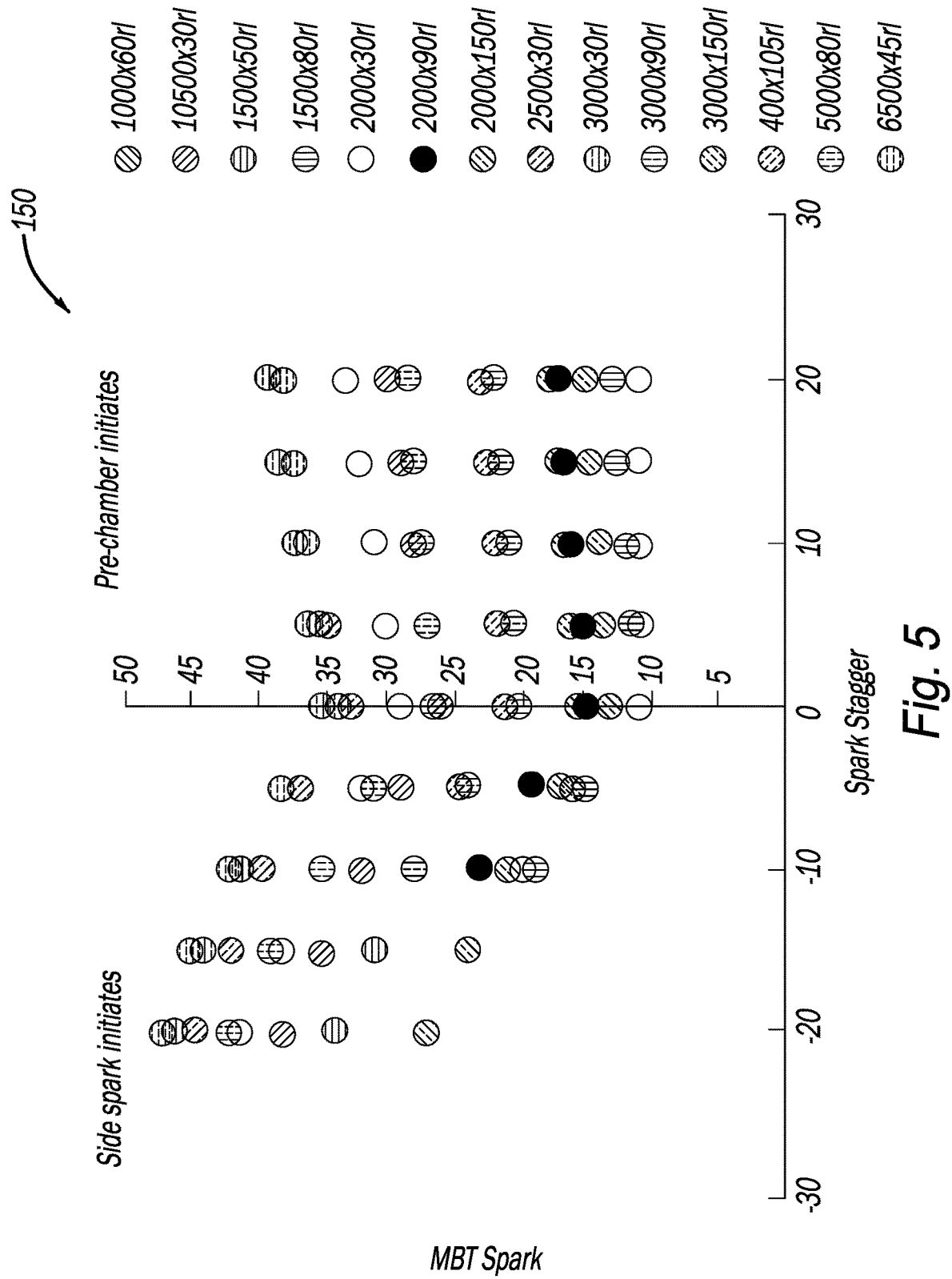
FIG. 5 is an exemplary plot of maximum brake torque versus spark stagger according to the present disclosure.

FIG. 5 illustrates exemplary spark stagger events for an engine 20. For spark stagger events identified as zero (0), both the pre-chamber spark plug 56 and the side (second) spark plug 60 fire at the same time. When a stagger event is negative, the second spark plug 60 initiates spark first. Alternatively, when the stagger event is positive, the pre-chamber (first) spark plug 56 initiates spark first. As shown, depending how control alters the spark stagger, the MBT can also be altered. As a result, the torque model 100 can be used to adjust the spark timing to achieve the desired engine torque depending on vehicle demand.

Figure 7:
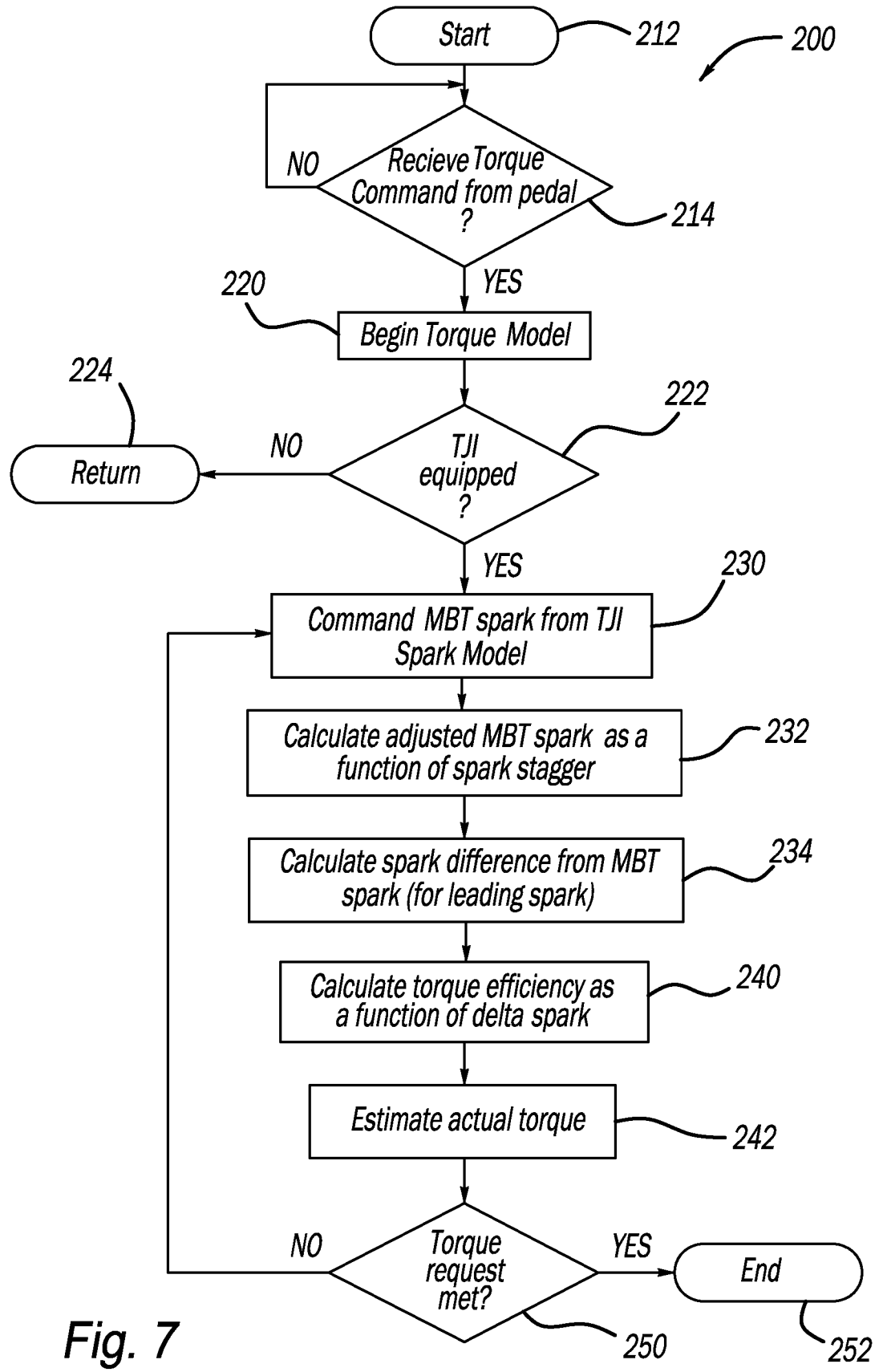
FIG. 7 is a flow diagram of an example torque estimation control method according to the principles of the present disclosure.

Referring now to FIG. 7, an example flow diagram of an example torque estimation control method 200 according to the principles of the present disclosure is illustrated. While the method 200 is described with respect to the exemplary TJI engine 20, it will be appreciated that the method could be applicable to any TJI engine. Control begins at 210. At 212 control determines whether a torque command has been received by the vehicle system 72. In this example, control determines whether a torque command has been received by the accelerator pedal 80 at 214. If a torque command has not been received, control loops to 214. If a torque command has been received, control begins the torque model at 220. At 222, the controller 70 determines whether the engine 20 is a TJI engine. If the engine is not a TJI engine, the method returns at 224. If control determines that the engine 20 is a TJI engine, the controller 70 commands MBT spark from the TJI spark model at 230. At 232, control calculates an adjusted MBT spark as a function of spark stagger. As explained above, the adjusted MBT spark is identified at 144 in FIG. 4.

At 234, control calculates a spark difference (delta spark) from the MBT spark (for leading spark). Delta spark is explained above and represented at 140, FIG. 4. At 240 control calculates a torque efficiency as a function of delta spark. As explained above, the torque efficiency is identified at 112 in FIG. 4. Control estimates an actual torque at 242. The actual torque 102 is based on multiplying engine maximum or optimal potential torque 110 and torque efficiency 112, shown in FIG. 4. Control then determines whether the torque request has been met at 250. If the torque request has not been met, control loops to 230. If the torque request has been met, control ends at 252. It will be appreciated that alternatively, control can loop to 214 for continuous control.

It will be appreciated that the term "controller" as used herein refers to any suitable control device(s) that is/are configured to perform at least a portion of the techniques of the present disclosure. Non-limiting examples include an application-specific integrated circuit (ASIC), one or more processors and a non-transitory memory having instructions stored thereon that, when executed by the one or more processors, cause the controller to perform a set of operations corresponding to at least a portion of the techniques of the present disclosure. The one or more processors could be either a single processor or two or more processors operating in a parallel or distributed architecture. It should also be understood that the mixing and matching of features, elements, methodologies and/or functions between various examples may be expressly contemplated herein so that one skilled in the art would appreciate from the present teachings that features, elements and/or functions of one example may be incorporated into another example as appropriate, unless described otherwise above.

What is claimed is:

1. A combustion control system for a turbulent jet ignition (TJI) engine having a first ignition device disposed in a pre-chamber of a cylinder head and a second ignition device disposed for communication with a main combustion chamber, the system comprising:
a controller configured to:
receive a torque request;
determine a target spark stagger based on a first spark from the first ignition device and a second spark from the second ignition device;
determine an adjusted maximum brake torque (MBT) based on the target spark stagger;
determine a delta spark based on a difference between the adjusted MBT and an actual leading spark from the first and second ignition devices;
determine a torque efficiency based on the delta spark;
estimate an actual torque; and
command a first and second spark timing from the first and second ignition devices to satisfy the torque request.

2. The system of claim 1 wherein the actual leading spark comprises a maximum actual spark realized based on an actual first spark from the first ignition device and an actual second spark from the second ignition device.

3. The system of claim 1 wherein estimating an actual torque comprises:
determining an optimal torque; and calculating the actual torque as a product of the optimal torque and the determined torque efficiency.

4. The system of claim 3 wherein the optimal torque is based on a revolutions per minute (RPM) of the TJI engine and an air charge entering the TJI engine.

5. The system of claim 3 wherein the adjusted MBT is determined by an efficiency model.

6. The system of claim 5 wherein the efficiency model is based on a nominal spark stagger and nominal MBT spark.

7. The system of claim 6 wherein the nominal spark stagger is positive for a spark event that initiates from the first ignition device.

8. The system of claim 7 wherein the nominal spark stagger is negative for a spark event that initiates from the second ignition device.

9. The system of claim 1 wherein the TJI engine is a four-cylinder engine.

10. A combustion control method for a turbulent jet ignition (TJI) engine of a vehicle, the engine having a first ignition device disposed in a pre-chamber of a cylinder head and a second ignition device disposed for communication with a main combustion chamber, the method comprising:
receiving, by a controller of the vehicle, a torque request;
determining, by the controller, a target spark stagger based on a first spark from the first ignition device and a second spark from the second ignition device;
determining, by the controller, an adjusted maximum brake torque (MBT) based on the target spark stagger;
determining, by the controller, a delta spark based on a difference between the adjusted MBT and an actual leading spark from the first and second ignition devices;
determining, by the controller, a torque efficiency based on the delta spark;
estimating, by the controller, an actual torque; and
commanding, by the controller, a first and second spark timing from the first and second ignition devices to satisfy the torque request.

11. The method of claim 10 wherein the actual leading spark comprises a maximum actual spark realized based on an actual first spark from the first ignition device and an actual second spark from the second ignition device.

12. The method of claim 10 wherein estimating an actual torque comprises:
determining an optimal torque; and
calculating the actual torque as a product of the optimal torque and the determined torque efficiency.

13. The method of claim 12 wherein the optimal torque is based on a revolutions per minute (RPM) of the TJI engine and an air charge entering the TJI engine.

14. The method of claim 12 wherein the adjusted MBT is determined by an efficiency model.

15. The method of claim 14 wherein the efficiency model is based on a nominal spark stagger and nominal MBT spark.

16. The method of claim 15 wherein the nominal spark stagger is positive for a spark event that initiates from the first ignition device.

17. The method of claim 15 wherein the nominal spark stagger is negative for a spark event that initiates from the second ignition device.

18. The method of claim 10 wherein the TJI engine is a four-cylinder engine.

* * * * *